PRODUCTION OF MAGNETIC RECORDING MEDIA

Filed Jan. 6, 1969

INVENTORS:
GEORG SCHNELL
JOB-WERNER HARTMANN
HEINZ STRITZINGER
WERNER SENKPIEL
HANS JOERG HARTMANN
ERICH ALBERT SOBOTTA
KARL UHL
GERHARD WERST
BY
Johnston, Root, O'Keeffe, Keil, Thompson & Shurtleff
ATT'YS United States Patent Office 3,592,687
Patented July 13, 1971

3,592,687

PRODUCTION OF MAGNETIC RECORDING MEDIA

Georg Schnell, Job-Werner Hartmann, Heinz Stritzinger, and Werner Senkpiel, Ludwigshafen, Hans Joerg Hartmann, Wachenheim, Erich Albert Sobotta, Ludwigshafen, Karl Uhl, Frankenthal, and Gerhard Werst, Neustadt, Germany, assignors to Badische Anilin- & Soda-Fabrik Aktiengesellschaft, Ludwigshafen (Rhine), Germany Filed Jan. 6, 1969, Ser. No. 789,240
Claims priority, application Germany, Jan. 5, 1968, P 12 99 721.6-53
Int. Cl. H01f *10/02*
U.S. Cl. 117—237 6 Claims

ABSTRACT OF THE DISCLOSURE

A method of producing magnetic recording media by applying to a base a coating of a dispersion of a magnetic pigment, pretreated with wax or wax-like substances, in a special curable copolymer of alkenyl benzene hydrocarbons, (meth)acrylic esters, etherified N-methylamides of (meth)acrylic acid and an additional comonomer, drying and curing the applied coating; and the magnetic recording material thus obtained.

Figure 1:
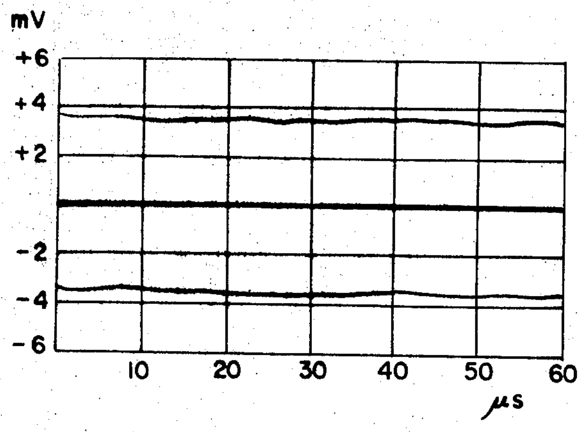

The invention relates to a method of producing magnetic recording media, which comprises preparing a mixture based on finely dispersed pretreated magnetic particles, an improved binder and a solvent, applying the dispersion of magnetic particles in the binder and solvent to a base or substrate in the form of a coating and then drying and curing the applied magnetizable coating.

The production of magnetic recording media by coating a base, such as a foil, tape or disc of plastics or nonmagnetic metal, with a dispersion of magnetic material which must have certain minimum magnetic properties in a binder and an organic solvent is well known in the art. In particular in the production of magnetic discs that are to be used for data storage, high demands are made on the usually very thin coating. The coating must adhere firmly to the base and it must be highly resistant to solvent attack, to temperature changes, moisture and particularly to abrasion. The layer in which the magnetic material is presently embedded in the binder must be extremely hard, but at the same time it must not be brittle. The binder used for preparing this layer therefore largely determines the mechanical and chemical properties of the recording medium. Modern magnetic tapes are highly stressed and tape wear is a complex process. Magnetic recording media are exposed to thermal and abrasive stresses and the tape may be damaged by erosion of the layer containing the magnetic particles by abraded particles that stick together and adhere to the recording and reproducing heads and by the retransference of abraded material from the recording head to the recording media. Hence the nature of the abraded material is also a matter of importance. Various polymers and mixtures of polymers have already been proposed as binders for the dispersion of the particulate magnetic pigment. The use of copolymers of predominant amounts of vinyl chloride and comonomers, such as vinyl acetate, is already known. Moreover, binders that have also been used in the production of magnetic recording media include polyamides, combinations of butylated melamine formaldehyde resin with polyvinyl butyral resin and a combination of epoxy resins with phenol formaldehyde condensation products. A mixture of polyisocyanates and higher molecular weight hydroxyl compounds has also been proposed. However, conventional binders are not satisfactory in every respect. Some of them cause difficulties during processing, for instance by changing their viscosity or the uniformity of the magnetic pigment concentration, whereas others fail to provide the magnetic values or to exhibit the chemical resistances that are desired after they have been oven-dried and aftertreated.

It has now been found that the production of magnetic recording media having outstanding magnetic properties and a particularly uniform output level by preparing a dispersion of particulate magnetic pigment in a binder, a solvent and, if desired, conventional additives, applying a layer of the dispersion to the base material, drying, curing the layer and optionally finishing the surface of the applied layer, while avoiding the familiar difficulties and considerably improving the anchorage of the magnetic powder in the layer, can be advantageously carried out by employing as binder, a curable copolymer A containing the following polymerized units:

(a) 20 to 65% by weight of alkenyl benzene hydrocarbons containing 8 to 10 carbon atoms,
(b) 20 to 55%, particularly 20 to 45%, by weight of esters of acrylic and/or methacrylic acid with alkanols containing 1 to 12 carbon atoms,
(c) 8 to 35%, particularly 18 to 25%, by weight of alcohol-etherified N-methylol amides of acrylic acid and/or methacrylic acid, and
(d) 0.5 to 30%, particularly 0.5 to 15%, by weight of another monoolefinically unsaturated monomer, and, as magnetic pigment, one that has been pretreated with wax or a wax-like substance.

With regard to the components of the binder used in the process; according to this invention, the following observations should be made:

The curable copolymer A should be substantially soluble in conventional solvents and should be produced from the specified monomers or it should contain the units of these monomers in the specified amounts.

Of the specified alkenyl benzene hydrocarbons containing 8 to 10 carbon atoms styrene is preferred. However, vinyl toluenes, vinyl xylenes or α-methyl styrene may also be used. The copolymer contains between 20 and 65%, particularly between 41 and 51%, by weight of units of alkyl benzene hydrocarbons. The use of larger quantities of styrene or vinyl toluene imparts a high degree of hardness to the layers.

Suitable esters of acrylic and/or methacrylic acid with alkanols containing 1 to 12, particularly 1 to 8 carbon atoms, include the methyl methacrylate, the ethyl acrylate, the tert.-butyl (meth)acrylate, the 2,2-dimethylpentyl ester and the 2-ethylhexyl ester of (meth)acrylic acid as well as mixtures of these esters. The choice of the quantity and type of ester or ester mixture depends upon the desired modification of the properties, particularly of the hardness and elasticity, of the layer. For instance, the use of small amounts, for example up to 25% by weight, of acrylates containing 5 to 12 atoms in the alkyl radical, and of large amounts of styrene imparts a high degree of elasticity to the resultant layers.

Examples of ethers of N-methylol amides of acrylic acid and/or methacrylic acid with an alcohol, particularly an alcohol containing 1 to 8 carbon atoms, polymerized units of which are contained in copolymer A in quantities between 8 and 35%, particularly between 18 and 25%, by weight, are the ethers of N-methylol acrylamide and N-methylol methacrylamide with N-butanol, isobutanol 2-ethyl hexyl alcohol, benzyl alcohol or monomethyl ethylene glycolate. The n-butyl ethers of N-methylol(meth) acrylamide are preferred.

The copolymers used as binder components according to th invention may be modified in a conventional manner by incorporating up to 30%, particularly up to 15%, by weight of another monoolefinically unsaturated monomer into the copolymer by polymerization. Commercial comonomers used in the production of binders for surface coatings are particularly useful for this purpose.

It is very advantageous to incorporate into the copolymer by polymerization either up to 10% by weight of olefinically unsaturated carboxylic acids containing 3 to 5 carbon atoms or up to 15%, particularly 2 to 11%, by weight of olefinically unsaturated monomers having an alcoholic hydroxyl group, or both monomers at the same time. Particularly suitable olefinically unsaturated carboxylic acids containing 3 to 5 carbon atoms are acrylic or methacrylic acid. However, crotonic acid or maleic acid may also be used. The carboxylic acids used enable the binder to be hardened at relatively low temperatures and they also contribute toward making the binder hard and improving its adhesion to the substrate.

Particularly suitable olefinically unsaturated monomers having an alcoholic hydroxyl group are monoesters of acrylic and/or methacrylic acid and a glycol, particularly semiesters of (oxa)-alkane diols having 2 to 6 carbon atoms, such as the mono(meth)acrylates of butanediol-1,4, pentanediol-1,5, propanediol-1,2, propenediol-1,3, ethylene glycol and diethylene glycol. The employment of the olefinically unsaturated monomers having alcoholic hydroxyl groups facilitates hardening of the binder and assists in imparting solvent and temperature resistance to the layers produced with the copolymer as binder.

Other suitable comonomers are acrylamide, methacrylamide, acrylonitrile, methacrylonitrile, vinyl chloride, vinylidene chloride, N-vinylamides and N-vinyllactams, such as N-vinyl-N-methylacetamide and N-vinylcaprolactam.

Very suitable copolymers consist of 25 to 32% by weight of 2-ethylhexyl acrylate or methacrylate, 41 to 51% by weight of styrene, 18 to 25% by weight of N-n-butoxymethyl acrylamide or methacrylamide and 0.5 to 3% by weight of acrylic or methacrylic acid. Copolymers derived from 40 to 60% by weight of styrene, 20 to 32% by weight of an ester of (meth)acrylic acid and an alkanol containing 5 to 8 carbon atoms, 15 to 30% by weight of an ether of N-methylol (meth)acrylamide, 3 to 10% by weight of a monoester of (meth)acrylic acid and an alkanediol containing 3 to 4 carbon atoms and 0.5 to 5% by weight of (meth)acrylic acid are particularly suitable. The copolymers used as binders according to the invention may be produced in a conventional manner, e.g. by solution, suspension or emulsion polymerization.

It is often advantageous to use, in addition to the curable copolymers A as binders, 5 to 35%, particularly 8 to 20%, by weight, with reference to copolymer A, of a curable polyepoxy compound. Very suitable polyepoxy compounds are commercial polyglycidyl ethers of low molecular compounds having 2 to 5 hydroxy groupings, polyhydric alcohols and particularly polyhydric phenols, of which the commercially available polyglycidyl ether obtained from 2,2-bis-bis(p-hydroxyphenyl)propane and epichlorohydrin has proved to be particularly useful.

Particulate rod- or cube-shaped gamma-iron(III) oxide and particularly gamma-iron(III) oxide whose particles have an average size of 0.1 to 2μ, is preferred as magnetic pigment. Moreover, conventional particulate alloys of heavy metals, particularly of iron, cobalt and/or nickel, may be used for this purpose.

Suitable waxes or wax-like compounds are both naturally occurring waxes, such as Carnauba wax, beeswax, ozokerite, and synthetic waxes, particularly wax-like compounds which have moderately low molecular weights, for instance in the range between 1000 and 10,000, and contain a certain amount of oxygen in the molecule. Hence, for example degraded polyethylene waxes which are moderately branched, contain about 2 to 6% of oxygen and have acid numbers between 20 and 50, are particularly suitable. Such waxes or wax-like compounds are preferably used in the form of their aqueous dispersions, generally in amounts of 1 to 7%, advantageously 3 and 5%, by weight of the wax with reference to the weight of the magnetic pigment.

The magnetic powder is preferably pretreated by suspending it in the aqueous wax dispersion and allowing an aluminum sulfate solution to run in until precipitation takes place.

For the preparation of the dispersion of the magnetic pigment 70 to 140, particularly 100 to 130, parts by weight of the proposed binder, with reference to the solids content, is usually used per 100 parts by weight of the treated magnetic powder. The dispersion of the treated magnetic pigment or magnetic powder is preferably prepared by dispersing the same in the proposed binder and a sufficient amount of solvent by a conventional method, for example in a ball mill. Suitable organic solvents for the production of the dispersions are aromatic hydrocarbons, such as benzene, toluene or xylene, glycol ethers, such as ethyl glycol, glycol ether esters, such as ethyl glycol acetate, alcohols, such as propanol and butanol, ketones, such as acetone and methyl ethyl ketone, mixtures thereof as well as other solvents and solvent mixtures generally used as binders for surface coatings. The binder may be dissolved in these solvents and the magnetic pigment dispersed in this solution, or alternatively the binder, the magnetic pigment and the solvent may be directly mixed in the dispersing apparatus. The other constituents are added to this mixture either in the solid state or in the form of 20 to 60% solutions. It has been found to be advantageous to continue dispersing until the magnetic pigment is extremely finely distributed, which may take 1 to 4 days. A completely homogeneous magnetic dispersion is then obtained by repeated filtering.

The application of the dispersion to the base material in the form of a layer can be carried out by conventional methods. Owing to the great hardness and the particularly high adhesion to the substrate of layers prepared with the binders and magnetic pigments according to the invention and the very good pigment binding power of the binder mixtures, the method according to the invention of producing rigid magnetic discs using metal, particularly aluminum, supports, has proved to be particularly suitable. Layers of binder/magnetic pigment mixtures according to this invention can be applied particularly well to metal discs or cylinders by the centrifugal casting method described in U.S. patent specification No. 2,913,-246. In this method the magnetic dispersion is kept moving in a rotary apparatus, further filtration being effected at the same time. The mixture is then poured from a movable arm onto the slowly revolving disc. By increasing the number of revolutions to about 600 to 1000 r.p.m. the excess magnetic dispersion is flung off and a uniform layer of the dispersion remains on the disc. The back of the disc is coated in the same way. It will be readily understood that this convenient method of coating makes special demands on the properties of the magnetic dispersion and consequently of the binder employed.

By subjecting the applied film to a heat treatment at about 120 to 230° C., preferably for ½ to 1 hour, the binder is cured and the final hardness of the magnetic layer is achieved. The curing period can be reduced and the curing temperature lowered by adding cure catalysts, such as acids, e.g. phosphoric acid or hexahydrophthalic acid. Finally, the surface is finished by a conventional polishing method.

The method according to the invention is distinguished by the fact that it is easy to carry out and that no trouble is experienced even when the centrifugal casting process is used. The improved anchorage of the pigment in the magnetic layer, at the same ratio by weight of magnetic powder to binder, enables magnetic layers to be obtained that are so hard, adhere so well and are so resistant to abrasive wear that one can almost speak of an enamel-like surface.

It is worthy of particular note that dispersions of the magnetic pigments can be prepared with the binders and pigments according to this invention which are so good that their application by centrifugal casting produces homogeneous layers that are completely free from any kind of pigment agglomerations.

The parts and percentages mentioned in the following examples are by weight unless otherwise stated.

Parts by volume bear the same relation to parts by weights as the liter to the kilogram.

PREPARATION OF A LIQUID COATING COMPOSITION

Example 1

100 parts by weight of a gamma-$Fe_2O_3$ that has been pre-pretreated with a polyethylene wax, 180 parts by weight of a solvent mixture consisting of equal parts of xylene and butanol, 200 parts by weight of a 55% solution of a copolymer derived from:

- 44% by weight of styrene,
- 28% by weight of 2-ethyl hexylacrylate,
- 20% by weight of N-n-butoxymethyl methacrylamide,
- 6% by weight of butanediol-1,4 monoacrylate,
- 2% by weight of acrylic acid in a xylene butanol mixture, together with
- 5 parts by weight of oleic ethanolamide as dispersing auxiliary are dispersed for 12 hours in a steel ball mill. A completely homogeneous magnetic dispersion is then obtained by repeated filtering.

Example 2

A preliminary dispersion of a magnetic pigment is prepared by dispersing for 2 hours in a ball mill 100 parts by weight of a gamma-$Fe_2O_3$ that has been pretreated with polyethylene wax.

180 parts by weight of ethyl glycol acetate, 2 parts by weight of soybean lecithin and 31 parts by weight of polyvinyl methyl ether.

193 parts by weight of a 50% solution of:

- 10 parts by weight of a copolymer derived from 32% by weight of styrene,
- 20% by weight of N-n-butoxymethyl methacrylamide,
- 43% by weight of ethyl acrylate,
- 5% by weight of methacrylic acid, and
- 0.57 part by weight of a bisphenol A diglycidyl ether in a mixture of equal parts of n-butanol and xylene is then stirred into the preliminary dispersion and the finished magnetic dispersion is filtered under pressure through a paper filter.

PRODUCTION OF A MAGNETIZABLE LAYER

The magnetic dispersion is kept in motion in a rotary apparatus, further filtration being effected at the same time. The mixture is then poured onto a slowly revolving (aluminum) disc which is about 1 mm. thick and 30 cm. in diameter. By increasing the number of revolutions to 600 to 1000 r.p.m. the excess magnetic dispersion is flung off and a uniform layer is obtained. The back of the disc is coated in the same way.

The magnetic film is cured by subjecting it to a heat treatment at about 150° C. for one hour (or at 220° C. for half an hour in Example 2) and is then about 8$\mu$ thick. A reduction in the curing time or the curing temperature can be achieved by admixing catalysts (usually acid compounds, such as phosphoric acid, and hexahydrophthalic acid). Finally the surface is finished by a conventional polishing method.

TESTING THE MAGNETIC UNIFORMITY OF THE LAYER

The disc is recorded on a suitable drive and the output voltage can then be visualized on an oscillograph and photographed.

Figure 2:
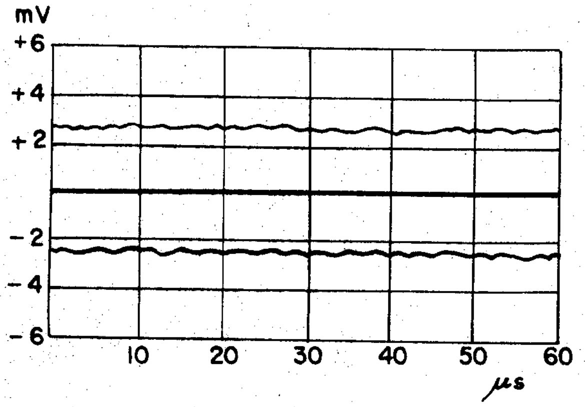

FIG. 1 shows this recording, the output level being plotted on the ordinate axis and the time on the abscissa (speed of rotation of the magnetic disc: 1500 min.$^{-1}$). FIG. 2 shows the recording made under the same conditions a commercially available magnetic disc which has been provided with a magnetic layer in the manner described in Germany printed application No. 1,174,443; The improved uniformity amplitude of the magnetic layer according to the invention is apparent.

We claim:

1. In a method of producing magnetic recording media by preparing a dispersion of a magnetic pigment in a mixture of a binder and an organic solvent, applying a layer of said dispersion to the base material and drying and curing said applied layer, the improvement which comprises dispersing a magnetic pigment that has been pretreated with a wax or a wax-like substance in a mixture containing as binder a heat-curable copolymer prepared by polymerization of the following monomers:

(a) 20 to 65% by weight of an alkenyl benzene hydrocarbon containing 8 to 10 carbon atoms;

(b) 20 to 55% by weight of an ester selected from the group consisting of acrylic acid esters of acrylic acid with alkanols containing 1 to 12 carbon atoms, methacrylic acid esters of methacrylic acid with alkanols containing 1 to 12 carbon atoms and mixtures of said esters;

(c) 8 to 35% by weight of an alcohol-etherified N-methylolamide selected from the group consisting of N-methylolamides of acrylic acid, N-methylolamides of methacrylic acid and mixtures of said N-methylolamides; and (d) 0.5 to 30% by weight of another monoolefinically unsaturated monomer.

2. A method as claimed in claim 1 wherein said binder includes 5 to 35% by weight, with reference to the amount of said copolymer, of a curable polyglycidylether of a low molecular weight compound having 2 to 5 hydroxy groupings.

3. A method as claimed in claim 1 wherein component (d) of said copolymer is an olefinically unsaturated carboxylic acid containing 3 to 5 carbon atoms.

4. A method as claimed in claim 1 wherein component (d) of said copolymer is a monoester of a glycol having 2 to 6 carbon atoms and acrylic acid or methacrylic acid.

5. A method as claimed in claim 1 wherein component (d) of said copolymer is a mixture of an olefinically unsaturated carboxylic acid containing 3 to 5 carbon atoms and a monoester of a glycol having 2 to 6 carbon atoms and acrylic acid or methacrylic acid.

6. Magnetic recording media comprising a non-magnetic substrate to which there is adhered a binder coating containing a magnetic pigment which has been pretreated with a wax or a wax-like substance, said binder consisting essentially of a heat-cured copolymer prepared from the following monomers:

(a) 20 to 65% by weight of an alkenyl benzene hydrocarbon containing 8 to 10 carbon atoms;

(b) 20 to 55% by weight of an ester selected from the group consisting of acrylic and methacrylic acid of acrylic acid and methacrylic acid with alkanols containing 1 to 12 carbon atoms and mixtures thereof;

(c) 8 to 35% by weight of an alcohol-etherified N-methylolamide selected from the group consisting of N-methylolamides of acrylic acid and methacrylic acid and mixtures thereof; and (d) 0.5 to 30% by weight of another monoolefinically unsaturated monomer.

References Cited

UNITED STATES PATENTS

| | | | |
|---|---|---|---|
| 2,791,561 | 5/1957 | Beller et al. | 117—234X |
| 2,954,552 | 9/1960 | Halpern | 117—234X |
| 3,061,454 | 10/1962 | Graf et al. | 117—235 |
| 3,139,354 | 6/1964 | Wolf | 117—235 |
| 3,151,550 | 10/1964 | Newman | 117—235X |
| 3,228,881 | 1/1966 | Thomas | 117—234X |
| 3,352,710 | 11/1967 | Wolf et al. | 117—161X |

WILLIAM D. MARTIN, Primary Examiner

B. D. PIANALTO, Assistant Examiner

U.S. CL. X.R.

117—161, 235; 252—62.54

PO-1050
(5/69)

UNITED STATES PATENT OFFICE
CERTIFICATE OF CORRECTION

Patent No. 3,592,687 Dated July 13, 1971

Inventor(s) Georg Schnell et al

It is certified that error appears in the above-identified patent and that said Letters Patent are hereby corrected as shown below:

Column 3, line 12, "th" should read -- the --.

Column 6, line 74, Claim 6, "acid of" should read -- acid esters of --.

Signed and sealed this 7th day of March 1972.

(SEAL)
Attest:

EDWARD M.FLETCHER,JR.
Attesting Officer

ROBERT GOTTSCHALK
Commissioner of Patents